Nov. 16, 1965   F. K. H. NALLINGER ETAL   3,218,088
ARRANGEMENT TO FACILITATE THE ACCESSIBILITY
OF A PASSENGER MOTOR VEHICLE
Original Filed Aug. 18, 1958   4 Sheets-Sheet 1

INVENTORS.
FRIEDRICH K. H. NALLINGER
JOSEF MÜLLER
KARL WILFERT

BY Dicke and Craig
ATTORNEYS

Nov. 16, 1965  F. K. H. NALLINGER ETAL  3,218,088
ARRANGEMENT TO FACILITATE THE ACCESSIBILITY
OF A PASSENGER MOTOR VEHICLE
Original Filed Aug. 18, 1958  4 Sheets-Sheet 2

INVENTORS.
FRIEDRICH K. H. NALLINGER
JOSEF MÜLLER
KARL WILFERT
BY Dicke and Craig
ATTORNEYS Nov. 16, 1965          F. K. H. NALLINGER ETAL          3,218,088
            ARRANGEMENT TO FACILITATE THE ACCESSIBILITY
                   OF A PASSENGER MOTOR VEHICLE
Original Filed Aug. 18, 1958                          4 Sheets-Sheet 3
Fig. 7a.
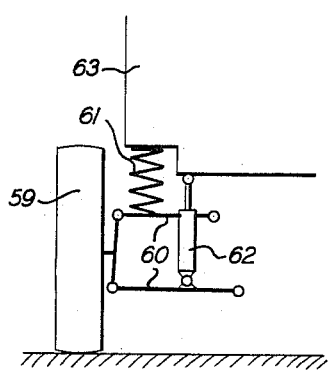
Fig. 7b.
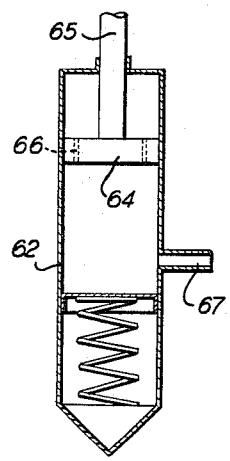
Fig. 8b.
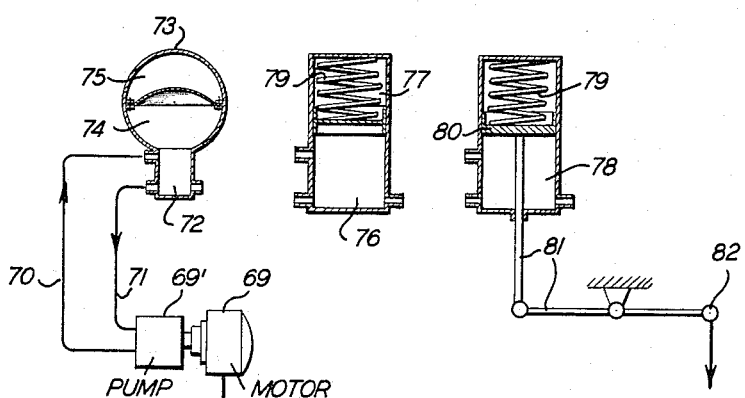
Fig. 8a.
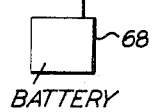
Fig. 8c.
INVENTORS.
FRIEDRICH K. H. NALLINGER
JOSEF MÜLLER
KARL WILFERT
BY Dicke and Craig
                ATTORNEYS United States Patent Office 3,218,088
Patented Nov. 16, 1965

3,218,088
ARRANGEMENT TO FACILITATE THE ACCESSIBILITY OF A PASSENGER MOTOR VEHICLE
Friedrich K. H. Nallinger, Stuttgart, Josef Müller, Stuttgart-Riedenburg, and Karl Wilfert, Stuttgart-Degerloch, Germany, assignors to Daimler-Benz Aktiengesellschaft, Stuttgart-Unterturkheim, Germany
Original application Aug. 18, 1958, Ser. No. 755,465. Divided and this application Oct. 26, 1962, Ser. No. 237,420
Claims priority, application Germany, Aug. 16, 1957, D 26,213
2 Claims. (Cl. 280—6)

This application is a division of application Serial No. 755,465 of Friedrich K. H. Nallinger, Josef Mueller and Karl Wilfert, filed August 18, 1958, and now abandoned.

The present invention relates to an installation and arrangement for facilitating the ingress or boarding and egress or descending from the vehicle in connection with motor vehicles, particularly those which have a relatively slight constructional height.

There is at present a tendency in the motor vehicle design and construction to manufacture passenger motor vehicles with ever lower constructional heights. This tendency is not only based on considerations of styling but may also be traced back to the intention to adapt the vehicle, notwithstanding the increased speed thereof, to the shape with as favorable as possible a streamline and with a low resistance to the air-flow. This may ultimately lead to such a low constructional height of the vehicle that the boarding conditions thereof deteriorate to such an extent as can no longer be expected to be acceptable to the passengers.

It has already been proposed in the prior art to obviate these shortcomings by the creation of boarding hoods whereby a sufficiently large area for boarding the vehicle is rendered free from above after lifting up the hoods. However, this construction is a compromise solution, beset with still further shortcomings, especially as it is not possible to use such boarding hoods with relatively larger vehicles since the hoods in that case become too large and are then too difficult to open. In order to make these hoods lighter they are usually made of Plexiglas and, therefore, are not constructed very sturdily or rigidly. However, this entails the further disadvantage that such hoods are easily broken or damaged.

The present invention eliminates the aforementioned disadvantages by enabling the vehicle to be lifted above the normal position thereof for purposes of ingress and egress therefrom which is possible, for example, by changing or adjusting the spring system.

Vehicles are known in the prior art in which the spring characteristics may be adjusted either manually or automatically during the drive in order to adapt the spring system to the different speeds or to different loads. A secondary subordinate result of such a prior art installation is the fact that the vehicle may assume different levels. However, this secondary result in such prior art devices does not anticipate the present invention since the present invention is concerned with changing the level of the vehicle, not during the drive, but only during standstill of the vehicle so as to facilitate the boarding thereof. The present invention may also be realized, inter alia, by changing the vehicle height through adjustments of the shock absorbers and/or by additional stroke elements.

The change of the vehicle height may be produced by increasing the spring tension, and more particularly, by exerting an increased pressure, either hydraulically or mechanically, on the auxiliary spring system provided therefor.

According to another construction based on the present invention, the vehicle is raised by changing the point of attack of the spring system at the lever arm with a spring system effective on a lever rod or linkage system.

According to another construction which is also based on the invented concept, additional stroke elements are arranged in addition to the normal spring system which act on the axle members and lift the same from the springs.

The lifting of the vehicle above the normal position thereof may also take place by undertaking a relieving action of the springs by means of additional stroke elements which abut directly against the road.

In most modern vehicles, hydraulic shock absorbers are provided. Such shock absorbers may also be used for purposes of lifting the vehicle provided the hydraulic shock absorbers are in communication with a pressure unit or aggregate for the supply of oil or air pressure. The oil or air pressure additionally supplied to these shock absorbers lifts the pistons thereof whereby, however, only the surface of the piston rod is effective as piston surface because the piston as such is provided with bores which serve as oil passage from one side of the piston to the other. By lifting the piston in the shock absorber above the normal height thereof, the vehicle is also lifted and the springs are correspondingly relieved.

In general, the stroke elements of the present invention which influence the spring system of the vehicle are so arranged that the entire vehicle is lifted. Under certain circumstances this, however, is not necessary, for instance, with vehicles in which the seats are arranged relatively far forwardly in the vehicle or with a unilateral or one-sided boarding arrangement for the vehicle. For that purpose, the stroke elements may be so constructed that they act only on the spring members of the front or of the rear axle or only on those of one side of the vehicle.

Particularly with the use of stroke elements which are effective or act on the axle members of the vehicle, such stroke elements may also be provided as auxiliary spring elements in case of damage to the main springs and may then be rendered operative or engaged so that the vehicle can be driven to a repair place by means of the auxiliary spring element or elements though with only a slight spring comfort. The same is also true for the use of shock absorbers as stroke elements which, in case of failure of the main or normal springs, may also find usefulness as auxiliary spring elements.

For purposes of actuating the spring elements, it is necessary to keep in readiness an energy storage device which supplies, even after lengthy periods of rest of the vehicle, still so much energy that the vehicle may be lifted. Appropriately, a storage container or tank is provided in which the energy for lifting the vehicle is stored in the form of gaseous pressure.

However, according to another embodiment of such an energy storage device, the energy may also be stored in the form of spring pressure.

According to still a further embodiment of the present invention, the energy necessary for lifting the vehicle may be stored in a battery which effects lifting of the vehicle over an oil pump driven by an electric motor.

In its simplest form, the actuation or initiation of the lifting operation takes place manually by actuating an engaging or starting switch as shown, for example, by Davidson, U.S. Patent 1,429,411, or starting valve. However, such valves or switches have to be arranged on the inside of the vehicle in order to avoid unauthorized actuation thereof, i.e., would be accessible, therefore, only after opening of the door. This type of actuating possibility is somewhat complicated. It is, therefore, appropriate within the scope of the present invention to actuate the initiation of the lifting operation by opening of a door. For that purpose, push-button switches may be provided at the doors which cooperate with magnets possibly over a suitable relay. The start-up control system is also so constructed that after closing all the doors of the vehicle the lifting operation automatically ceases so that the vehicle is again lowered. This can be readily achieved by having all normally open switches arranged in parallel so that all doors must be closed to reopen the energizing circuits to the magnets or control relays therefor. The initiation of the operation may also be caused in a similar manner during opening of a lock. It is further appropriate, in addition to the automatic actuation by means of a door or similar locking or closure device to enable selective manual actuation thereof by means of a hand lever arranged at the dashboard so that the vehicle may be selectively raised or lowered at the will of the driver or passenger and the automatic control arrangement is thereby put out of operation.

Accordingly, it is an object of the present invention to provide a raising and lowering system for vehicles which facilitates boarding of the vehicle, particularly in case of low-slung modern streamlined vehicles.

Still another object of the present invention is to provide a raising and lowering mechanism, operative either automatically or selectively during standstill of the vehicle to facilitate boarding of the vehicle by the passengers without sacrificing rigidity or sturdiness of the vehicle superstructure, particularly of the vehicle top.

Still another object of the present invention is to provide a raising and lowering system for motor vehicles which utilizes either existing elements of the wheel suspension or utilizes parts which can be simply installed and which assures reliable operation under all conditions even if the vehicle has been at standstill for a considerable length of time.

These and other objects, features and advantages of the present invention will become more obvious from the following description when taken in connection with the accompanying drawing which shows, for purposes of illustration only, several embodiments in accordance with the present invention, and wherein:

FIGURE 7a is a partial end view of a wheel suspension provided with a raising mechanism in accordance with the present invention in which the shock absorber is used for purposes of changing the vehicle height;

FIGURE 7b is a schematic cross-sectional view of a shock-absorber arrangement in accordance with the present invention which may be used in the arrangement of FIGURE 7a;

FIGURE 8a is a schematic view of an energy storage system for use with a raising and lowering mechanism in accordance with the present invention;

FIGURES 8b and 8c are cross-sectional views through two embodiments of energy storage devices usable for the raising and lowering mechanism in accordance with the present invention;

Figure 1A:
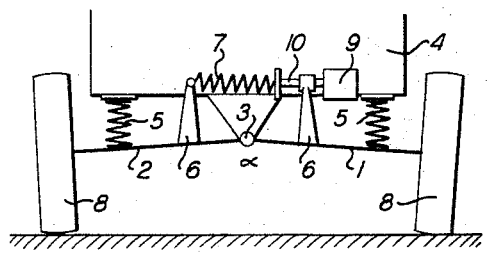
FIGURE 1a is a schematic end view of a vehicle wheel suspension provided with a mechanical raising mechanism in accordance with the present invention.

Referring now to the drawings, wherein like reference numerals are used throughout the various views to designate corresponding parts, and more particularly to FIGURE 1a, which shows a vehicle front or rear axle suspension consisting of two half or partial axle members in a schematic manner, reference numerals 1 and 2 designate therein the two half or partial axles which are pivotally supported in the center in a joint 3 and are connected therewith one with another. The vehicle body schematically shown and designated by reference numeral 4 is supported on the axle members 1 and 2 by means of suitable springs 5. An auxiliary or additional spring 7 acts additionally on the axle members 1 and 2 over lever arms 6 rigidly connected thereto by means of which the wheels 8 may be forced or pressed downwardly up to a certain degree. If the spring 7 is further loaded or compressed, then the levers 6 are pressed further apart from each other whereby the angle $\alpha$ subtended between the axle members 1 and 2 is reduced and the wheels 8 are pressed further downwardly so that the vehicle body 4 is effectively raised thereby. The additional spring loading or compression of spring 7 is effected by means of a reversible electric motor 9 which compresses the spring 7 by means of threaded spindle 10 which in turn cooperates with a corresponding internal thread provided in the right-hand lever 6 of FIGURE 1a. The motor 9 can be controlled by conventional switch means such as shown in the patent to Davidson, U.S. Patent 1,429,411, previously referred to.

Figure 1B:
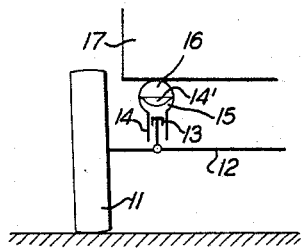
FIGURE 1b is a partial schematic end view of a vehicle wheel suspension provided with a hydraulically actuated raising mechanism in accordance with the present invention.

FIGURE 1b illustrates a pneumatic spring wheel suspension. The wheel 11 is spring-supported or spring-suspended over axle member 12 and piston 13 which slides or reciprocates upwardly and downwardly within the cylinder 14. A fluid is present in the space 15 above piston 13, usually consisting of oil, and an air space 16 separated from the oil space 15 by a suitable, elastic membrane member 14' is disposed above the oil space 15. The air space 16 serves as spring body by reason of its compressibility. If the air pressure in space 16 is increased or an additional oil pressure is pumped into the space 15, then the spring coefficient of the pneumatic spring is increased and the height or level of the vehicle 17 is also increased thereby.

Figure 2A:
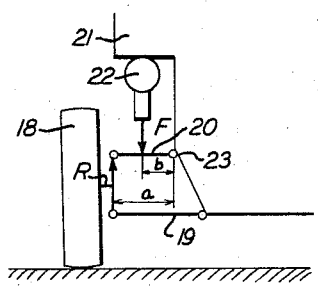
FIGURES 2a and 2b are schematic partial end views of a wheel suspension provided with a raising mechanism in accordance with the present invention in which the change in the height of the vehicle is obtained by changing the place of attack of the springs or of the lever arm on which the spring acts.
Figure 2B:
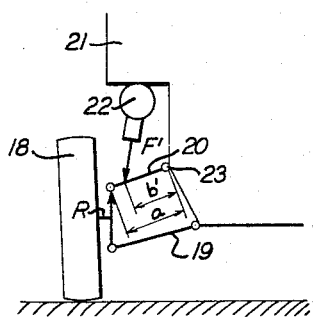

FIGURES 2a and 2b illustrate the possibility of achieving lifting of the vehicle by changing the lever on which the spring acts or attacks. The wheel 18 is spring-suspended at the vehicle body 21 over lever arms 19 and 20. Furthermore, the vehicle body 21 is in equilibrium over spring element 22 with the wheel suspension on the basis of lever arms $a$ and $b$. On the one hand, spring force F acts on the lever rod or linkage 20 at a distance $b$ from the pivot point 23 and, on the other, the reaction force R of the wheel 18 acts thereon at a distance $a$ from the pivot point 23. If now, by inclining the spring 22 as illustrated in FIGURE 2b, the lever arm is increased from $b$ to $b'$ the existing equilibrium is disturbed and a new equilibrium will establish itself at the wheel suspension or at the vehicle body with different lengths of the effective lever arms. As a result thereof, the wheel 18 is forced or pushed downwardly and the vehicle body 21 is thereby raised correspondingly.

Figure 3:
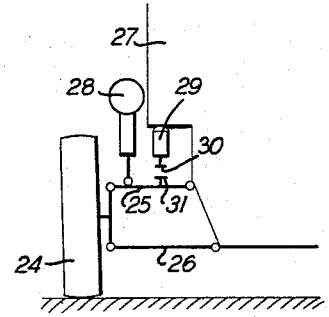
FIGURE 3 is a partial schematic end view of a wheel suspension provided with a raising mechanism in accordance with the present invention having an additional stroke element acting on the axle.

In FIGURE 3, the wheel 24 is supported over a lever rod system 25 and 26 and is pivotally connected to a vehicle bearer member of the frame. A pneumatic spring 28 serves for spring-supporting the vehicle 27. In order to increase the height of the vehicle 27 for purposes of boarding, stroke elements 29 are arranged below the vehicle body 27 at any suitable place, possibly underneath a vehicle longitudinal or cross bearer member which are actuated pneumatically. By such actuation, the plunger member 30 is displaced outwardly of the element 29, finds an abutment at the counter-support 31, and thereby forces the wheel 24 downwardly by counterpressure against this abutment 31 and therewith lifts the vehicle body 27 upwardly.

Figure 4:
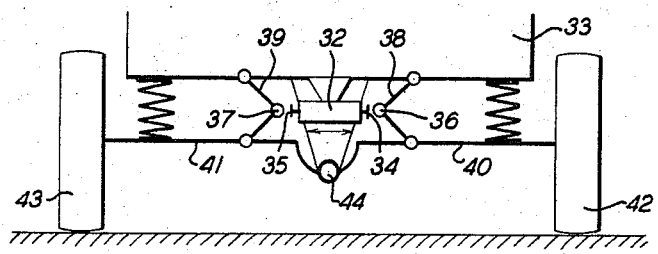
FIGURES 4 and 5 are schematic end views of two embodiments of a wheel suspension provided with a raising mechanism in accordance with the present invention including separate levers acting on the lever system of the springs.

FIGURE 4 illustrates also an additional stroke element 32 which is arranged below the vehicle body 33. In FIGURE 4, the element 32 is a double-acting stroke element with rectilinearly movable plunger members 34 and 35 which act on the joints 36 and 37 of the pivotally connected knee-like lever arrangement connecting levers 38 and 39 with each other. If the plunger members 34 and 35 move outwardly the joints 36 and 37 of the angular lever systems are also pushed outwardly and therewith the space between the lower edge of the vehicle body 33 and the axle members 40 and 41 is increased so that the wheel 42 and 43 which are adapted to be pivoted or swung about the point of rotation 44 thereof are forced downwardly whereby the vehicle body 33 is forced upwardly.

Figure 5:
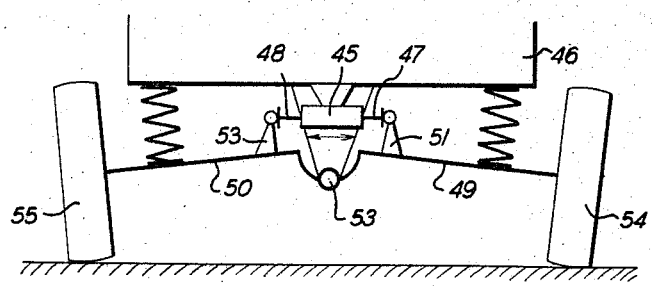

A double-acting stroke element 45 is also arranged below the vehicle body 46 in FIGURE 5. The rectilinearly movable plunger members 47 and 48 of the stroke element 45 are shown in the outermost position thereof. The plunger members 47 and 48 act against the levers 51 and 52 rigidly connected with the wheel axle members 49 and 50. Since the wheel axle members 49 and 50 are also adapted to be pivoted in this case about a pivot point 53, the axle members 49 annd 50, together with the wheels 54 and 55, are thereby forced downwardly and the vehicle body 46 is thereby raised when plunger members 47 and 49 are in the outermost position thereof.

Figure 6:
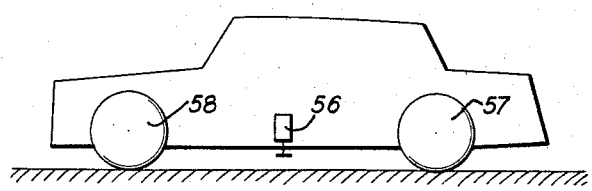
FIGURE 6 is a schematic side view of a motor vehicle provided with a stroke or jack-type lifting element adapted to support itself directly against the road.

FIGURE 6 schematically shows a stroke element 56 which is arranged in the center between the wheels 57 and 58 on one side of the vehicle only. The stroke or jack-type element 56 acts directly against the road and thereby lifts the vehicle from the road on the particular side of the vehicle.

FIGURES 7a and 7b show the use of shock absorbers for lifting the vehicle. The wheel 59 illustrated in FIGURE 7a is spring-suspended at the vehicle body 63 by means of lever linkage system 60 and of spring 61, as well as by means of shock absorber 62. Normally, the shock absorber 62 only has the task of damping the vibrations of the spring 61. When oil pressure is supplied to the shock absorber 62, then the piston 64, disposed on the inside thereof as shown in FIGURE 7b, is lifted and thereby the vehicle body 63 is also lifted or raised with respect to the road. As will be clear also from FIGURE 7b, with the use of the shock absorber 62 as stroke elements, only the surface of the piston rod 65 can be considered as effective piston surface since the piston 64 itself is provided with bores 66 by means of which the oil within the shock absorber may flow from one side of the piston to the other to permit the primary function of the shock absorber 62. The oil line 67, for purposes of increasing the oil pressure, is also shown in FIGURE 7b.

As already mentioned hereinabove, it is necessary that for purposes of lifting the vehicle, the necessary energy is available at all times. In the best, most practical form, such energy is placed, in readiness for use, in energy storage devices.

FIGURE 8a shows an over-all storage installation with a battery 68, an electric motor 69 drivingly connected with a pump 69′, a supply line 70 and a discharge line 71 leading to and from the switching or shifting device 72; the pressure reservoir 73 provided with an oil chamber 74 and a gas chamber 75 adjoins the switching device 72. If such an installation is provided for lifting the vehicle, then the same has to be constructed tight in its entirety in order to be able to retain even after a relatively longer period of time a corresponding pressure in the spring elements and to be capable of supplying or making available the differential amount of pressure for lifting the vehicle by pumping action. On the other hand, only the reservoir may be constructed in a tight manner. However, the energy storage capacity thereof would have to be made so large that it suffices in order to bring the vehicle from the low or normal position thereof to the required height.

FIGURE 8b shows an oil reservoir with spring pressure which, for the second case, has to be constructed in a tight manner. A sufficiently large pressure is constantly maintained in the oil chamber 76 which compresses the spring 79 in the cylinder portion 77. During use, i.e., if the vehicle is to be raised, then by opening a suitable valve (not shown), the oil pressure in space 76 is permitted to flow off into appropriate cylinder chambers (not shown) for purposes of providing the required pumping action to lift the vehicle by means of the energy stored in spring 79.

FIGURE 8c shows a further construction in which a spring 79, compressed by oil pressure in the cylinder 78, is used for lifting the vehicle. With a release of the oil from cylinder 78, the spring 79 exerts a spring force over piston 80 and linkage 81, possibly over pivot point 82, on the spring system of the vehicle and thereby lifts the vehicle.

The various elements and members forming part of the raising and lowering mechanism in accordance with the present invention which are all individually well known per se in the prior art and which may be of any suitable construction have been shown only schematically herein. It is understood that any suitable construction, for example, any independent wheel suspension, which may be used for spring suspending the various wheels of the vehicle.

Figure 9:
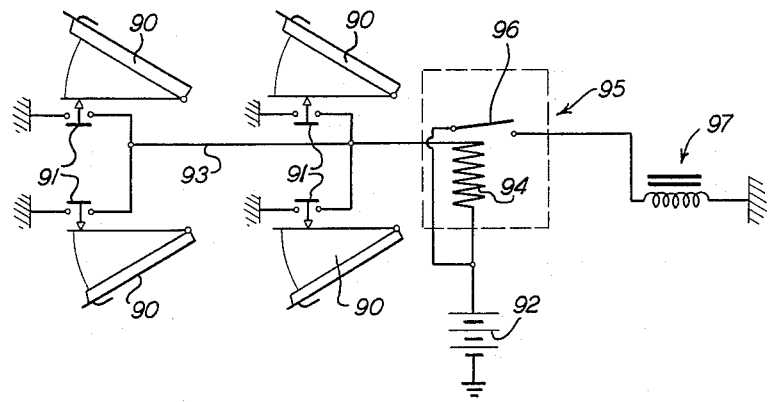
FIGURE 9 is a schematic diagram of a control circuit for use in connection with the present invention.

FIGURE 9 shows a control diagram for use in connection with the raising and lowering mechanism of the present invention in which reference numerals 90 designate doors schematically illustrated therein which cooperate with spring-loaded switches 91 in which a manner as to close a circuit upon opening a respective door. The spring-loaded switches or push button contacts 91 may be of any desired construction and may be provided in the door frame in the usual manner or may be operatively connected with the lock for the respective doors. A source of electric energy 92, such as the vehicle battery, is connected with one terminal thereof to the ground and with the other terminal thereof to a circuit 93 which includes the winding 94 of relay 95. The circuits containing the four switches 91 corresponding to a four-door vehicle are each connected in parallel between ground and circuit 93 so that, upon opening of any of the doors or upon closure of a manually operated switch 91, the coil 94 of relay 95 is energized thereby closing its contact 96 to provide an energization circuit for the relay 97 which may be either a magnet or servomotor influencing the arrangement for lifting and lowering a vehicle. Any suitable magnet or servomotor arrangement may be used in connection therewith.

Figure 10:
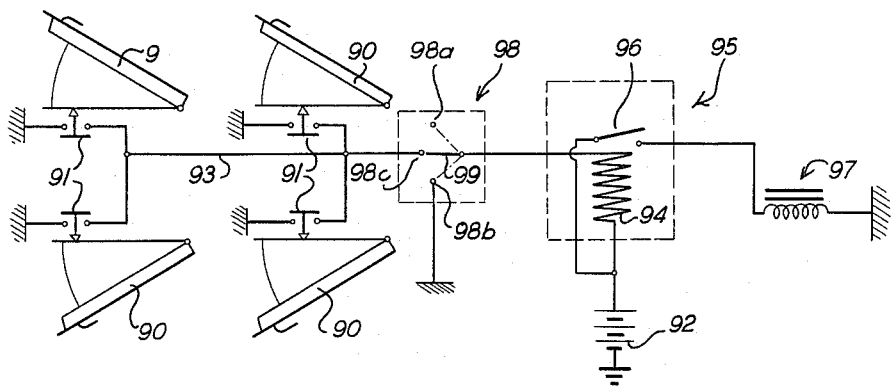
FIGURE 10 is a schematic diagram of a modified embodiment of a control circuit for use in connection with the present invention.

FIGURE 10 shows a control circuit arrangement essentially similar to that of FIGURE 9, in which a manually operable switch generally designated by reference numeral 98 is inserted into the energization circuit 93 for coil 94. The manually operable switch 98 includes a contact member 99 which, in the center position thereof, closes the circuit 93 when making an electrical contact with the terminal 98c. When the contact member 99 rests on the terminal 98a, the vehicle is lowered, whereas the vehicle is raised when the contact member 99 makes an electrical contact with the terminal 98b. Otherwise, the circuit of FIGURE 10 is essentially similar to that of FIGURE 9.

The control system for initiating the lifting and/or lowering operation in accordance with the present invention may be of any suitable construction of electrical, mechanical, hydraulic or pneumatic nature or combination thereof. Furthermore, the control system may be manually operated and/or automatically operated by opening and closing the vehicle doors or by opening and closing the vehicle door locks. Since such systems are well known in the prior art, a full description thereof is dispensed with herein. However, they may include automatically operated switches electrically energizing, over appropriate control circuits and possibly control relays, devices which will perform the necessary function to raise and lower the vehicle, for example, electromagnets provided with actuating plunger or stroke elements, electric motors driving an oil or air pressure, etc.

Thus, it is obvious that the present invention is not limited to the illustrated embodiments but is susceptible of many changes and modifications within the spirit and scope of the present invention, and we, therefore, do not wish to be limited to the illustrated embodiments but intend to cover all such modifications and changes thereof as are encompassed by the scope of the appended claims.

We claim:

1. On installation for facilitating passenger ingress into and egress from the body of a passenger motor vehicle having half-axles connected by pivot means carried by said body and common to each of said half-axles, comprising lever arm means connected to said half-axles and selectively operable means acting upon said lever arm means during the standstill position of said passenger motor vehicle to cause said half-axles to turn about said pivot means and raise said body beyond the normal driving position of said body during said ingress and egress, said lever arm means comprising arm members having one end of each thereof rigidly connected to said half-axles, said selectively operable means being effective to apply a force to the other ends of said arm members, said selectively operable means comprising adjustable spring means connecting said other ends of said arm members, said adjustable spring means comprising a spring operably connected between said other ends of said arm members, said selectively operable means further including a reversible electric motor carried by one of said arm members for adjusting the tension of said spring, and manual remote control motor reversing means for controlling said electric motor.

2. An installation according to claim 1, wherein main spring means are interposed between said half axles and said body, said adjustable spring means being effective to cushion said body especially in case of disablement of said main spring means.

References Cited by the Examiner
UNITED STATES PATENTS

| | | | |
|---|---|---|---|
| 1,990,798 | 2/1935 | Richter | 280—6 X |
| 2,128,660 | 8/1938 | Moorhouse | 267—20 |
| 2,134,515 | 10/1938 | Hoskyns | 280—124 X |
| 2,443,433 | 6/1948 | Sanmori | 280—124 |
| 2,757,376 | 7/1956 | Brueder. | |
| 2,809,862 | 10/1957 | Daniels | 296—44 |
| 2,836,431 | 5/1958 | Brueder | 280—112 |
| 2,844,386 | 7/1958 | Pribonic. | |
| 2,916,296 | 12/1959 | Muller | 280—124 |
| 2,929,640 | 3/1960 | Faivev. | |
| 2,939,723 | 6/1960 | Wisniewski. | |
| 2,978,256 | 4/1961 | Bertsch. | |
| 2,992,014 | 7/1961 | Muller | 280—124 |

FOREIGN PATENTS 698,524   11/1940   Germany.

A. HARRY LEVY, *Primary Examiner.*

LEO FRIAGLIA, *Examiner.*